(12) United States Patent
Katsu et al.

(10) Patent No.: US 6,824,685 B2
(45) Date of Patent: Nov. 30, 2004

(54) METHOD AND APPARATUS FOR TREATING WASTE WATER

(75) Inventors: Yosei Katsu, Kanagawa (JP); Toshihiro Tanaka, Kanagawa (JP)

(73) Assignee: Ebara Corporation, Tokyo (JP)

( * ) Notice: Subject to any disclaimer, the term of this patent is extended or adjusted under 35 U.S.C. 154(b) by 130 days.

(21) Appl. No.: 10/239,199

(22) PCT Filed: Mar. 27, 2001

(86) PCT No.: PCT/JP01/02473

§ 371 (c)(1),
(2), (4) Date: Sep. 27, 2002

(87) PCT Pub. No.: WO01/72643

PCT Pub. Date: Oct. 4, 2001

(65) Prior Publication Data

US 2003/0121852 A1 Jul. 3, 2003

(30) Foreign Application Priority Data

Mar. 27, 2000 (JP) .......................... 2000-86507

(51) Int. Cl.[7] ................................. C02F 3/12
(52) U.S. Cl. ...................... 210/626; 210/660
(58) Field of Search ................. 210/620, 621, 210/622, 623, 625, 626, 660, 663, 669, 195.2

(56) References Cited

U.S. PATENT DOCUMENTS

| | | | | |
|---|---|---|---|---|
| 3,490,590 A | * | 1/1970 | Davies | 210/616 |
| 4,568,463 A | * | 2/1986 | Klein | 210/607 |
| 4,861,471 A | * | 8/1989 | Nakao et al. | 210/182 |

FOREIGN PATENT DOCUMENTS

| | | |
|---|---|---|
| EP | 326359 | 8/1989 |
| JP | 55-137016 | 10/1980 |
| JP | 9-276889 | 10/1997 |
| JP | 10-15573 | 1/1998 |
| JP | 10-128375 | 5/1998 |
| JP | 11-19671 | 1/1999 |

* cited by examiner

*Primary Examiner*—Robert A. Hopkins
(74) *Attorney, Agent, or Firm*—Oblon, Spivak, McClelland, Maier & Neustadt, P.C.

(57) ABSTRACT

A wastewater treatment process involves solids-liquid separation after biological treatment, in which solids-liquid separation of activated sludge can be more efficiently performed. A mixture of wastewater and activated sludge obtained after biologically treating raw wastewater is introduced into a solids-liquid separation tank containing a water-permeable filter immersed therein and a dynamic filter layer of sludge is formed on the surface of the water-permeable filter to give a filtrate from the water-permeable filter.

11 Claims, 6 Drawing Sheets

(a)

(b)

METHOD AND APPARATUS FOR TREATING WASTE WATER

TECHNICAL FIELD

The present invention relates to wastewater treatment, more specifically solids-liquid separation of activated sludge or concentration of excess sludge, particularly wastewater treatment processes and systems involving solids-liquid separation of activated sludge that can be used for the treatment of organic industrial and domestic wastewaters.

BACKGROUND ART

In the water treatment using activated sludge processes, activated sludge must be separated into solids and liquid in order to obtain treated water. A typical method for this purpose involved introducing activated sludge into a clarifier to settle the sludge by gravity and discharging the supernatant as treated water from the clarifier. However, this method required a clarifier having a settling area and a retention time enough to settle activated sludge, resulting in an increased size of the treatment system and a considerable space. When the settling properties of activated sludge were impaired by bulking or other causes, the sludge flowed out from the clarifier to invite deterioration of treated water.

In recent years, a method for separating activated sludge into solids and liquid by membrane separation in place of the use of a clarifier has also been used. In this case, a microfiltration membrane or ultrafiltration membrane is normally used as a solids-liquid separation membrane. However, this method essentially required suction or pressurization by pumping for filtration normally at a pressure of several tens to several hundreds of kPa, which led to a high pumping power and resulted in an increased running cost. Membrane separation had the advantage that a clear effluent free from SS (suspended solids) could be obtained, but also had the disadvantage that the permeation flux was low and that periodic chemical washing was needed to prevent the membrane from contamination.

More recently, an alternative method to the clarifier for solids-liquid separation of activated sludge was proposed, which comprises immersing a filter consisting of a gas-permeable sheet such as a nonwoven fabric in an aeration tank to give a filtrate at a low hydraulic head pressure. A general view of this method is shown in FIG. 1. According to the proposed method, a diffuser tube for aeration 202 and a filter 204 are provided in a biological reaction tank 201, and a diffuser tube 203 for air-washing the filter is placed below the filter. During biological reaction (filtration operation), raw water to be treated is supplied from a raw water feed pipe 205 into biological reaction tank 201 and air or the like are diffused from diffuser tube 202 to perform a biological treatment with activated sludge in the tank, and then the treated mixture of activated sludge and water is passed through filter 204 and the effluent (filtrate) is removed via discharge pipe 206. During this, aeration by diffuser tube 202 generates a cross flow of activated sludge and water mixture (hereinafter also referred to as an activated sludge mixed liquor), including a downflow along the filter surface in biological reaction tank 201 (FIG. 1a). This cross flow forms a dynamic filter layer of activated sludge on the surface of filter 204, and the activated sludge mixed liquor is filtered by the resulting dynamic filter layer and removed via discharge pipe 206. When the filter layer formed on the surface of filter 204 is consolidated to increase the resistance to filtration and decrease the filtrate flow rate, aeration from diffuser tube 202 is stopped and air is diffused from diffuser tube 203 to remove the filter layer on the surface of the filter by air-washing (FIG. 1b). According to this method, a clear filtrate can be obtained by separation with a dynamic filter layer of sludge formed on the surface of the filter. The "dynamic filter layer of sludge" here refers to a deposit layer of activated sludge particles formed on the surface of the filter as filtration proceeds. The filter medium of the filter used in this method substantially has a pore size larger than that of activated sludge particles to allow the particles to pass, but a deposit layer of activated sludge particles (a dynamic filter layer of sludge) is formed on the surface of the filter medium under the condition of a low driving pressure for filtration so that this dynamic filter layer prevents activated sludge particles from passing through the medium. Filters commonly used in this method include nonwoven fabrics, woven fabrics, metal nets, etc. What is important in the method using the dynamic filter layer is to evenly and efficiently form a deposit layer of activated sludge particles as a filter layer on the surface of the filter medium with thickness, degree of compaction and other factors suitable for filtering activated sludge in order to reliably prevent the passage of activated sludge particles and to stably obtain treated water with good water quality. In the proposed method, it is defined that the dynamic filter layer is formed by controlling the flow rate of activated sludge flowing along the filter surface at an average of 0.05–0.4 m/s, preferably 0.15–0.25 m/s. In the proposed method, the filtration flux is about 2 m/d and the filtration duration is 2.5 h or more at a flow rate along the filter surface of 0.2 m/s, whereas the filtration flux is initially 4.1 m/d but rapidly deceases to 3.3 m/d after 45 min at a flow rate along the filter surface of 0.03 m/s.

A wastewater treatment system based on an activated sludge process was also proposed wherein a filter is immersed in at least one of a biological reaction tank and a final clarifier and the treated water is drawn from the filter via exits of the filter by the hydraulic head pressure difference from the succeeding tank.

However, these proposed methods had the following disadvantages. In the proposed methods, the flow of the sludge mixed liquor along the filter surface is formed by inducing a flow circulating in a tank by aeration. In these methods, however, the flow rate along the filter surface is not constant so that an even dynamic filter layer of sludge cannot be formed on the filter surface and the sludge readily deposits on the filter surface. Moreover, the water level in the biological reaction tank varies with the water inflow rate and the aeration air flow rate so that the hydraulic head pressure on the filter is not constant and the filtrate flow rate varies rather than remaining at a stable flow rate. If the hydraulic head pressure is unstable and extremely high, the water-permeability of the dynamic filter layer of sludge formed on the surface of the filter deteriorates, which may cause a sharp decline of the filtration flux. As a result, the washing frequency increases and the flux recovery rate after washing decreases. In addition, even minor residual organic contaminants such as BOD (biological oxygen demand) in the raw water entering into the biological reaction tank directly deposit on the filter and a biological slime grows on the surface of the filter to cause a remarkable decrease in filtrate flow rate.

When the filter is immersed in a final clarifier, the following problems occur. In the final clarifier using gravity settling of sludge, the sludge concentration in the clarifier is not even as shown by the fact that a thick sludge deposits at the bottom and the supernatant is collected from the top.

Thus, the sludge concentration is uneven at the part where the filter is immersed, with the result that a good dynamic filter layer cannot be formed and a stable effluent cannot be obtained.

We further studied in detail the relation between the filtration flux of the filter and the surface flow rate along the filter in the filtration method using a dynamic filter layer of activated sludge mixed liquor, and found that, when the flow rate along the filter surface is 0.05–0.4 m/s, particularly in a preferred range of 0.15–0.25 m/s, the sludge on the filter surface vigorously flows to make it difficult to form an even dynamic filter layer of sludge with an effective filtration area and the surface of the filter is rapidly blocked with fine sludge flocs to neutralize the effect even with air-washing or water-washing. We further found that a stable dynamic filter layer is formed very rapidly within 5 minutes and a filtration flux of 5 m/d or more can last for 4 hours or more when the surface flow rate is less than 0.05 m/s immediately after washing the filter and that the dynamic filter layer formed on the filter surface can be easily separated only by air-washing under the condition of a surface flow rate of less than 0.05 m/s.

Considering the above problems, we carefully studied to provide a method for more efficient solids-liquid separation of activated sludge mixed liquor, and as a result, we found that the solids-liquid separation of activated sludge can be very efficient by introducing raw water into a biological reaction tank to biologically treat it and then introducing the activated sludge mixed liquor treated in the biological reaction tank into a solids-liquid separation tank containing a water-permeable filter immersed therein to give a filtrate while forming a dynamic filter layer of sludge on the surface of the water-permeable filter. We also found that the dynamic filter layer of sludge can be stably formed on the surface of the water-permeable filter by limiting the moving velocity of the activated sludge mixed liquor along the surface of the water-permeable filter to less than 0.05 m/s in average. We also found that solids-liquid separation more efficiently proceeds when an equalizer (hereinafter also referred to as a flow rectifier) is provided in the solids-liquid separation tank so that the activated sludge mixed liquor passes along and through the surface of the water-permeable filter after it is straightened by the flow rectifier. The present invention was accomplished on the basis of these findings.

DISCLOSURE OF THE INVENTION

Accordingly, the present invention comprises the following aspects.

1. A wastewater treatment process involving solids-liquid separation of the activated sludge mixed liquor obtained after biologically treating raw wastewater, comprising introducing raw water into a biological reaction tank to biologically treat it, then introducing the activated sludge mixed liquor treated in the biological reaction tank into a solids-liquid separation tank containing a water-permeable filter immersed therein and forming a dynamic filter layer of sludge on the surface of the water-permeable filter to give a filtrate from the water-permeable filter by hydraulic head pressure.

2. A wastewater treatment process involving solids-liquid separation of the activated sludge mixed liquor obtained after biologically treating raw wastewater, comprising introducing raw water into a biological reaction tank to biologically treat it, then introducing the activated sludge mixed liquor treated in the biological reaction tank into a solids-liquid separation tank containing a water-permeable filter immersed therein and forming a dynamic filter layer of sludge on the surface of the water-permeable filter to give a filtrate by sucking the exit side of the water-permeable filter with a pump.

3. The process as defined in 1 or 2 above characterized in that the moving velocity of the activated sludge mixed liquor along the surface of the water-permeable filter is less than 0.05 m/s in average.

4. The process as defined in any one of 1 to 3 above characterized in that a flow rectifier is provided in the solids-liquid separation tank so that the activated sludge mixed liquor passes the surface of the water-permeable filter after it passes the flow rectifier.

5. A wastewater treatment system involving solids-liquid separation of the activated sludge mixed liquor obtained after biologically treating raw wastewater, comprising a biological reaction tank for introducing raw water to biologically treat it, and a solids-liquid separation tank containing a water-permeable filter immersed therein for introducing the activated sludge mixed liquor treated in the biological reaction tank to subject it to solids-liquid separation, characterized in that a dynamic filter layer of sludge is formed on the surface of the water-permeable filter to give a filtrate from the water-permeable filter by hydraulic head pressure.

6. A wastewater treatment system involving solids-liquid separation of the activated sludge mixed liquor obtained after biologically treating raw wastewater, comprising a biological reaction tank for introducing raw water to biologically treat it, and a solids-liquid separation tank containing a water-permeable filter immersed therein for introducing the activated sludge mixed liquor treated in the biological reaction tank to subject it to solids-liquid separation, characterized in that a dynamic filter layer of sludge is formed on the surface of the water-permeable filter to give a filtrate by sucking the exit side of the water-permeable filter with a pump.

7. The system as defined in 5 or 6 above characterized in that a flow rectifier is provided in the solids-liquid separation tank so that the activated sludge mixed liquor passes the surface of the water-permeable filter after it passes the flow rectifier.

According to the present invention, a solids-liquid separation tank is provided at the subsequent stage to a biological reaction tank and a water-permeable filter is immersed in the solids-liquid separation tank, whereby a clear filtrate can be obtained at a lower filtration pressure than used in prior processes.

In the processes of the present invention, the driving pressure used for obtaining a filtrate from the filter can be hydraulic head pressure or suction pressure by pumping. Filtration by hydraulic head pressure has the advantages that any motive power is unnecessary because the driving pressure for filtration uses natural gravity and that a low filtration pressure at which a dynamic filter layer is formed can be easily established, but also has the disadvantage that the filtrate flow rate tends to decrease by the consolidation of the filter layer. In contrast, filtration by suction pressure by pumping has the disadvantages that a motive power is required and that a low filtration pressure at which a dynamic filter layer is formed is difficult to stably keep, but also has the advantage that the filtrate flow rate is less liable to decrease. In the present invention, a more preferred one of these methods can be adopted in view of their disadvantages and advantages.

Suitable water-permeable filters for the present invention include any water-permeable filters known in the prior art such as nonwoven fabrics, filter cloths and metal nets and any of them produce similar effects. The filters can be used in any shape known in the prior art such as planar, cylindrical and hollow shapes, or can be used as a module filter consisting of a bundle of filters.

In the present invention, the average flow rate of the sludge mixed liquor introduced into the solids-liquid separation tank is preferably less than 0.05 m/s along the filter surface in order to stably form a dynamic filter layer on the surface of the water-permeable filter. This allows a good dynamic filter layer to be readily formed on the surface of the filter irrespective of whether the sludge mixed liquor passes downward or upward along the surface of the filter. The average flow rate of the sludge mixed liquor of less than 0.05 m/s along the filter surface reduces the decrease of the filtration flux and stably provides a high flux, whereby the volume of the solids-liquid separation tank can be greatly reduced as compared with prior clarifiers and therefore, a more compact treatment system can be provided. In the present invention, a unidirectional flow of sludge mixed liquor can be formed along the surface of the filter by, for example, removing the sludge mixed liquor treated in the solids-liquid separation tank (concentrated sludge mixed liquor) by a pump or other means on the opposite side to the inlet of the sludge mixed liquor in the solids-liquid separation tank. When the activated sludge mixed liquor treated in the biological treatment tank is introduced from the top of the solids-liquid separation tank into the solids-liquid separation tank, for example, a unidirectional flow of the sludge mixed liquor can be formed along the surface of the filter by removing the concentrated sludge mixed liquor by a pump or other means from the bottom of the solids-liquid separation tank. Thus, the flow rate of the sludge mixed liquor along the filter surface is adjusted by controlling the removal speed of the sludge mixed liquor from the solids-liquid separation tank. The removed concentrated sludge mixed liquor can be returned to the biological reaction tank or sludge thickener or sludge digestion tank or the like or removed as excess sludge.

When the average flow rate of the sludge mixed liquor passing along the surface of the filter is equal to or less than the settling velocity of sludge particles, the sludge mixed liquor is preferably introduced as a downflow with respect to the surface of the filter, i.e. from the top to the bottom of the solids-liquid separation tank. With this arrangement, a good dynamic filter layer of sludge is formed because the influent sludge inevitably passes the surface of the filter even if it settles.

In a more preferred embodiment of the present invention, a flow rectifier is preferably provided in the solids-liquid separation tank so that the activated sludge mixed liquor passes along the surface of the filter after it passes the flow rectifier. With this arrangement, the flow in the solids-liquid separation tank becomes unidirectional and a dynamic filter layer of sludge can be evenly formed on the surface of the filter.

In the system of the present invention, a washer is preferably provided below the filter in the solids-liquid separation tank. The sludge layer formed on the surface of the filter can be readily separated by regularly stopping filtration and washing the filter with this washer. Washing can be either one or both of air-washing and water-washing. During air-washing, the air flow rate is preferably controlled in such a manner that the upflow rate of air bubbles may be at least 0.2 m/s. A perforated tube having larger vent holes than those of prior diffuser tubes is desirably provided as an air-washing tube below the filter module. If such a perforated tube is used, a higher upflow rate can be attained than with diffuser tubes at a comparable aeration volume and ascending air bubbles are also large so that the sludge layer on the surface of the filter can be easily separated. The diameter of vent holes of the perforated tube is preferably 2 mm or more.

In the system of the present invention, sludge enters into the filter module before a dynamic filter layer of sludge is formed on the surface of the filter. Therefore, periodic discharge of sludge is desired to avoid deposition of sludge in the filter module. As a means for this sludge discharge, a sludge discharge pipe penetrating the filter module from the bottom to the inside is preferably connected to introduce waste sludge into the biological reaction tank. The discharging force is preferably gravity fall by hydraulic head pressure, and the hydraulic head pressure for discharging is preferably comparable to the hydraulic head pressure for filtration. However, pumping can be used as a sludge discharging force especially when the driving pressure for filtration is applied by pumping.

In the system of the present invention, the concentrated sludge formed in the solids-liquid separation tank is preferably returned to the biological reaction tank. This enables the BOD load in the biological reaction tank to be properly controlled, leading to a stable biological treatment. The activated sludge mixed liquor is gradually filtered and concentrated as it moves along the surface of the filter. Thus formed concentrated sludge mixed liquor is preferably returned as return sludge to the biological reaction tank. When sludge is introduced downward from the top of the solids-liquid separation tank, the concentrated sludge mixed liquor is preferably returned as return sludge to the biological reaction tank from the bottom of the solids-liquid separation tank.

As described above, the system of the present invention comprises a biological treatment tank and a solids-liquid separation tank, which may consist of a single tank divided by a partition into two chambers in liquid communication with each other through an opening at the bottom of the partition as shown in Example 1 below and FIG. 2, for example, or may consist of two separate tanks connected by a pipe as shown in Example 2 below and FIG. 7, for example.

BRIEF EXPLANATION OF THE DRAWINGS

Numerical references in the drawings represent the following elements: in FIG. 1, 201: biological reaction tank, 202: aeration diffuser tube, 203: air-washing diffuser tube, 204: filter, 205: raw water feed pipe, 206: filtrate discharge pipe; in FIG. 2, 1: influent raw water, 2: biological reaction tank, 3: blower, 4: opening at the outlet of biological reaction tank, 5: flow rectifier, 6: solids-liquid separation tank, 7: water-permeable filter, 8: intake pipe, 9: effluent, 10: washer, 11: concentrated sludge mixed liquor returning device, 12: sludge line, 13: diffuser tube, 14: diffuser tube, 15: partition; in FIG. 7, 101: influent raw water, 102: biological reaction tank, 103: biological reaction tank effluent, 104: sludge settling tank, 105: stirrer, 106: sludge feed pump, 107: solids-liquid separation tank, 108: filter module, 109: filtrate level regulating valve, 110: solenoid valve, 111: solenoid valve, 112: filtrate, 113: effluent tank, 114: discharged backwashing water level regulating valve, 115: solenoid valve, 116: water-backwashing pump, 117: check valve, 118: return sludge, 119: air-washing blower, 120: diffuser tube, 121: solenoid valve, 122: solenoid valve, 123: filtrate discharge pipe.

The following examples further illustrate the present invention without, however, limiting the invention thereto. In the following description, $COD_{Mn}$ means the chemical oxygen demand by potassium permanganate at 100° C., $S\text{-}COD_{Mn}$ means the soluble chemical oxygen demand by potassium permanganate at 100° C., $BOD_5$ means the biochemical oxygen demand for 5 days and $S\text{-}BOD_5$ means the soluble biochemical oxygen demand for 5 days.

EXAMPLE 1

Figure 1:
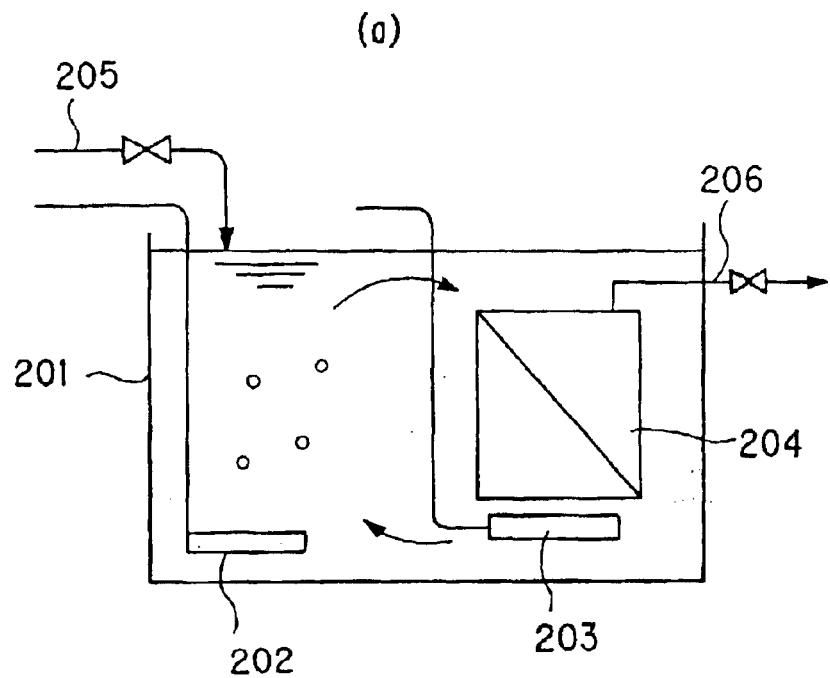
FIG. 1 is a general view of a solids-liquid separation process for activated sludge mixed liquors according to the prior art.
Figure 1:
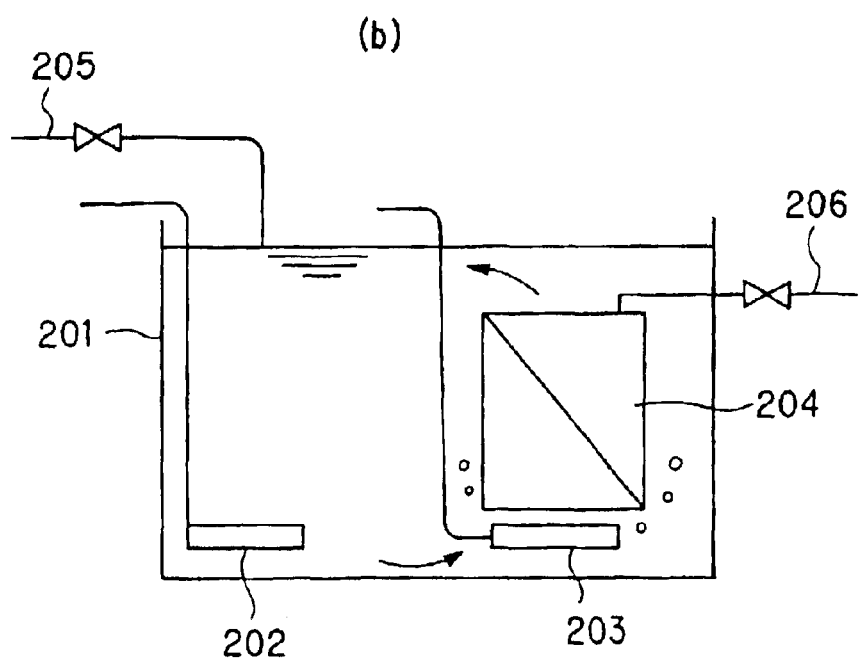
Figure 2:
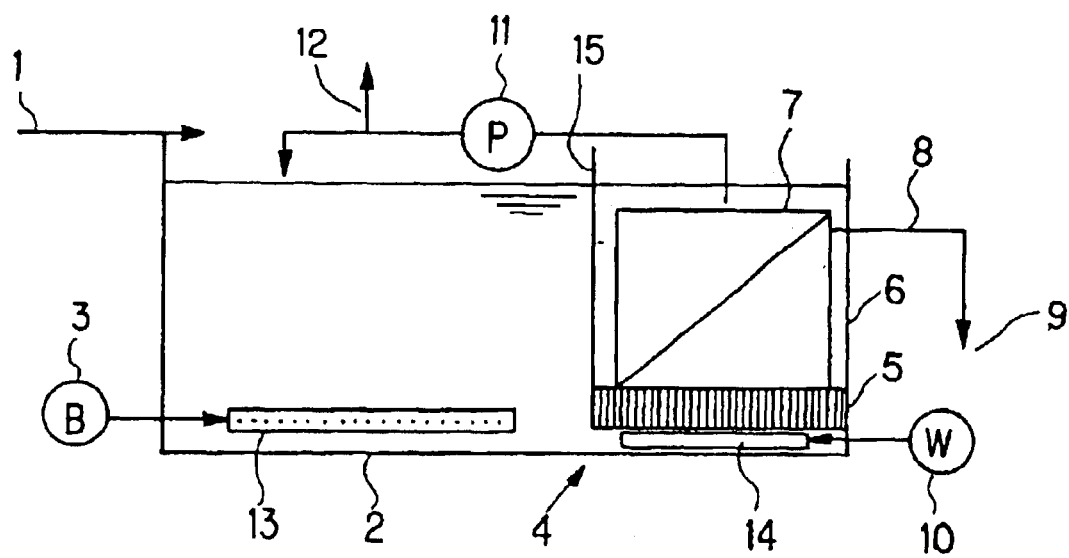
FIG. 2 is a flow sheet of an example of a wastewater treatment process according to the present invention.

FIG. 2 shows a flow sheet of an example of a wastewater treatment process for sewage from housing complexes according to the present invention. In the system shown in FIG. 2, biological reaction tank 2 and solids-liquid separation tank 6 are integrally formed and biological reaction tank 2 and solids-liquid separation tank 6 are separated by partition 15 while they are in liquid communication with each other via opening 5 at the bottom of partition 15. Influent raw water 1 is first introduced into biological reaction tank 2. In biological reaction tank 2, air is supplied by blower 3 via diffuser tube 13 to perform an aerobic treatment by the action of microorganisms in activated sludge contained in the tank. The activated sludge liquor exiting biological reaction tank 2 is supplied to the bottom of solids-liquid separation tank 6 via opening 4 formed at the bottom of partition 15. In solids-liquid separation tank 6, water-permeable filter 7 is provided and flow rectifier 5 is placed below the water-permeable filter. The activated sludge liquor having passed through opening 4 is supplied to the bottom of flow rectifier 5. The activated sludge mixed liquor having passed through flow rectifier 5 evenly flows up in solids-liquid separation tank 6 and is separated into solids and liquid by water-permeable filter 7. Effluent 9 is collected from intake pipe 8 of water-permeable filter 7 by the difference in hydraulic head pressure. Filter 7 is washed by periodically stopping filtration and blowing air via diffuser tube 14 from washer 10 located below the flow rectifier. The concentrated sludge mixed liquor in solids-liquid separation tank 6 is returned to biological reaction tank 2 by a pump 11 for returning concentrated sludge mixed liquor. Excess sludge is regularly discharged outside the system via sludge discharge pipe 12.

Treatment conditions in biological reaction tank 2 and treatment conditions in solids-liquid separation tank 6 in a wastewater treatment experiment using the system shown in FIG. 2 are shown in Table 1 and Table 2 below, respectively.

TABLE 1

Treatment conditions in the biological reaction tank (Example 1)

| | |
|---|---|
| Raw water flow rate (m³/d) | 10.0 |
| Returned concentrated sludge mixed liquor flow rate (m³/d) | 5.0 |
| MLSS (mg/L) | 2500 |
| BOD load (kg/kg.d) | 0.15 |

*MLSS = mixed liquor suspended solids.

TABLE 2

Treatment conditions in the solids-liquid separation tank (Example 1)

| | |
|---|---|
| Effective area of the solids-liquid separation tank (m²) | 0.040 |
| Effective volume of the solids-liquid separation tank (m³) | 0.060 |
| Effective area of the filter (m²) | 3.2 |
| Thickness of the filter (mm) | 0.4 |
| Areal density of the filter (g/m²) | 60 |
| Pore size of the filter (μm) | 20–30 |
| Hydraulic head pressure during filtration (cm) | 10 |
| Flow rate along the filter surface (m/s) | 0.006 |
| Flow rate along the filter surface during washing (m/s) | 0.5 |
| Filtration period / washing period (filtration suspended) | 6 hr / 3 min |

As shown in Table 1, the influent raw water flow rate into biological reaction tank 2 was 10 m³/d, and the concentrated sludge mixed liquor flow rate returned from solids-liquid separation tank 6 was 5 m³/d. The MLSS in biological reaction tank 2 was about 2500 mg/L. In this case, the BOD load in the whole tank was about 0.15 kg/kg.d.

The mixed liquor from biological reaction tank 2 was collected at opening 4 at the bottom of partition 15 (i.e. at biological reaction tank outlet) and the residual $BOD_5$ in the effluent was determined to show that the BOD in influent raw water 1 had been nearly completely degraded and removed in biological reaction tank 2 and that no undegraded BOD remained in the activated sludge mixed liquor entering into solids-liquid separation tank 6. Thus, the biological contamination at the filter surface could be controlled during filtration in solids-liquid separation tank 6. As a result, the life of the filter increased and a stable filtrate flow rate could be ensured for a long period. In order to attain the treatment effects described above, the BOD load in biological reaction tank 2 is preferably 0.3 kg/kg.d or less. Not only BOD removal processes such as anaerobic/aerobic process or nitrification/denitrification process but also biological processes for removing N and P can be employed.

As shown in Table 2, solids-liquid separation tank 6 having an effective area of 0.04 m² and an effective volume of 0.06 m³ was used for solids-liquid separation treatment in this example. Water-permeable filter 7 was a filter module consisting of 8 sheets of a planer nonwoven fabric filter having an effective area of 0.4 m² made of a polyester nonwoven fabric having a thickness of 0.4 mm and a pore size of 20–30 μm, and placed in solids-liquid separation tank 6. The average hydraulic head pressure during filtration was about 10 cm. The filtrate flow rate was 10 m³/d, and the activated sludge mixed liquor flow rate along the filter surface was about 0.006 m/s. Every 6 hours of filtration, filtration was stopped for 3 minutes and the filter was washed by aeration from washer 10. The aeration rate was adjusted in such a manner that the flow rate of air bubbles along the filter surface during washing might be 0.5 m/s in average.

Table 3 below shows the water quality of the effluent after a continuous wastewater treatment for about 2 months under these conditions as compared with the raw water quality.

TABLE 3

Water quality of
raw water and effluent (Example 1)

|  | Raw water | Effluent |
| --- | --- | --- |
| pH | 7.1 | 7.6 |
| Turbidity (degree) | 150 | 5.0 |
| SS (mg/L) | 86 | 4.6 |
| $COD_{Mn}$ (mg/L) | 75 | 12.5 |
| $S\text{-}COD_{Mn}$ (mg/L) | 42 | 11.0 |
| $BOD_5$ (mg/L) | 110 | 6.3 |
| $S\text{-}BOD_5$ (mg/L) | 65 | <5 |

*SS: Suspended solids.

As shown in Table 3, the effluent had pH=7.6, turbidity=5.0 degrees and SS=4.6 mg/L in contrast to pH=7.1, turbidity=150 degrees and SS=86 mg/L in the raw water, showing that the filtrate obtained by a dynamic filter layer of sludge formed on a nonwoven fabric filter was clear. The $COD_{Mn}$, $S\text{-}COD_{Mn}$, $BOD_5$ and $S\text{-}BOD_5$ of the effluent were 12.5 mg/L, 11.0 mg/L, 6.3 mg/L and 5 mg/L or less in contrast to the respective values of the raw water 75 mg/L, 42 mg/L, 110 mg/L and 65 mg/L, showing that the effluent water quality was also good.

Figure 3:
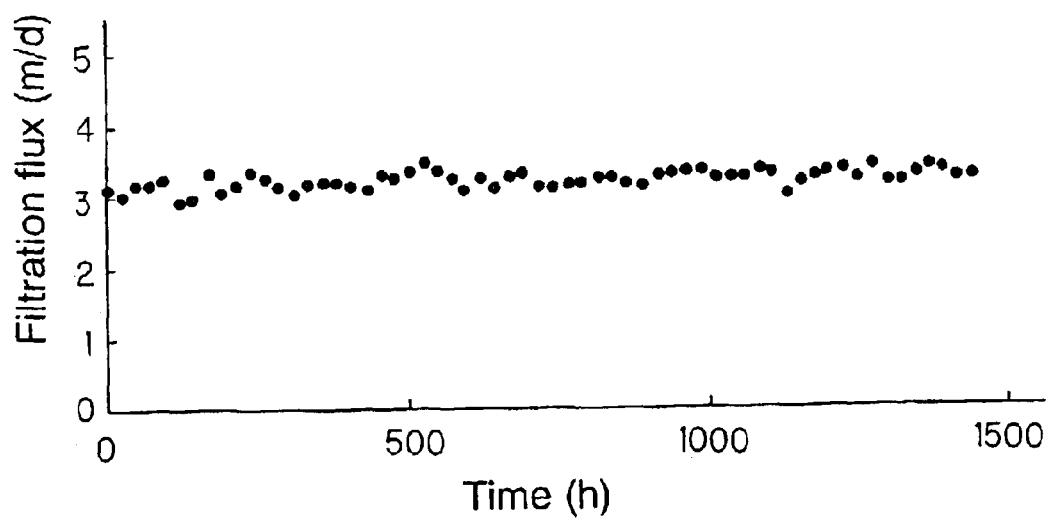
FIG. 3 is a graph showing plots of the average filtration flux versus time in Example 1.
Figure 4:
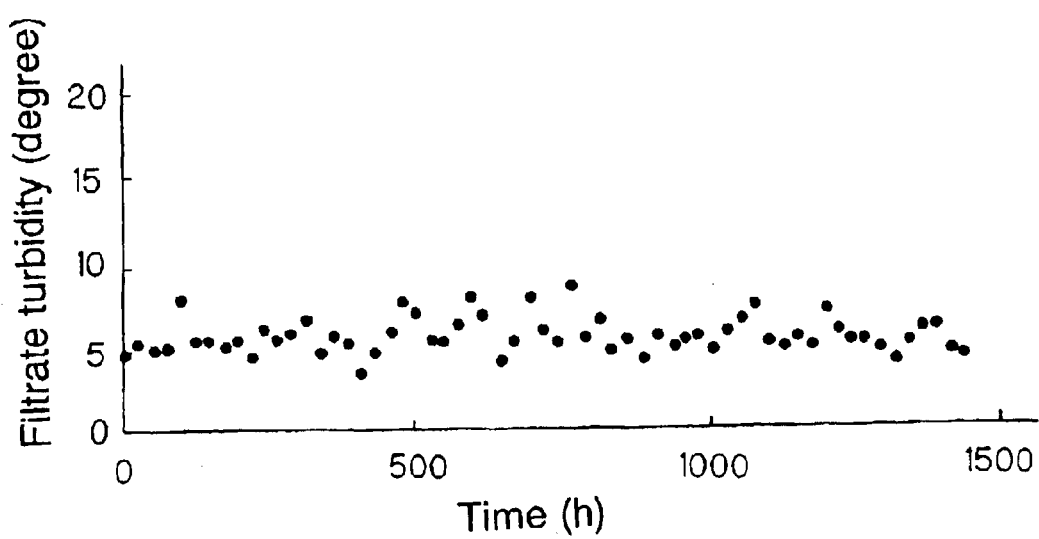
FIG. 4 is a graph showing plots of the filtrate turbidity versus time in Example 1.

FIG. 3 shows plots of the filtration flux versus time in Example 1. As shown in FIG. 3, the average filtration flux was about 3.2 m/d during a continuous treatment for about 1500 hours, demonstrating that a stable treatment was obtained. FIG. 4 shows plots of the turbidity of the effluent. As shown in FIG. 4, the turbidity of the effluent was always around 5 degrees without significant variation during a continuous treatment for about 1500 hours, demonstrating that a dynamic filter layer of sludge was stably formed and that a stable effluent water quality was obtained.

COMPARATIVE EXAMPLE 1

The same treatment system as used in Example 1 was used to perform a continuous wastewater treatment experiment under the same conditions as in Example 1 except that the flow rate of the concentrated sludge mixed liquor returned from solids-liquid separation tank 6 to biological treatment tank 2 was 85 m³/d to increase the flow rate of the sludge mixed liquor along the filter surface to 0.1 m/s, i.e. about 17 times higher than in Example 1.

Figure 5:
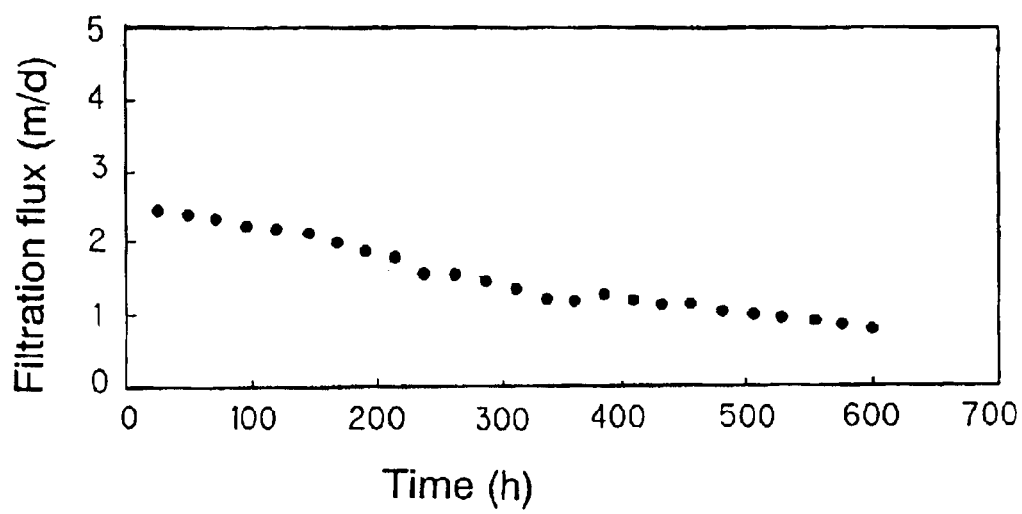
FIG. 5 is a graph showing plots of the average filtration flux versus time in Comparative example 1.
Figure 6:
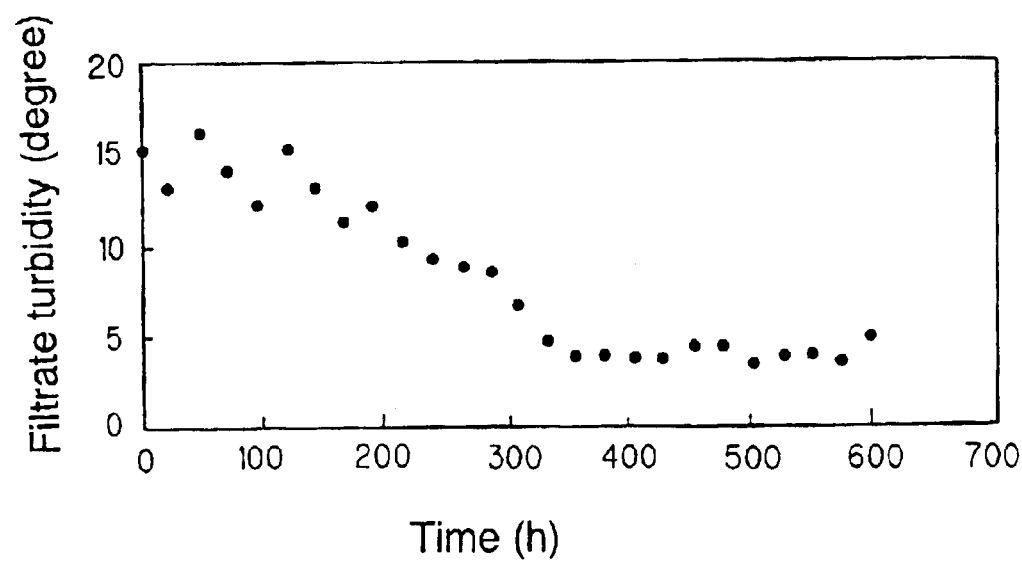
FIG. 6 is a graph showing plots of the filtrate turbidity versus time in Comparative example 1.

FIG. 5 shows plots of the filtration flux versus time in Comparative example 1, and FIG. 6 shows plots of the turbidity of the effluent. As shown in FIG. 5, the filtration flux was only 2.7 m/d even at the start of treatment, which is lower by about 10% or more than the sludge mixed liquor flow rate of 0.006 m/d in Example 1 when the flow rate of the sludge mixed liquor along the filter surface was 0.1 m/s. In Comparative example 1, the filtration flux rapidly decreased with time as shown by the filtration flux of 2 m/d or less after about 170 hours and 1 m/d or less after about 500 hours. At and after 500 hours of treatment, the interval between filter washing was shortened from air-washing for 3 minutes every 6 hours of filtration to air-washing for 3 minutes every 2 hours of filtration, but the filtration flux did not increase but gradually decreased. These results showed that the filtration flux decreased with deposition of fine sludge on the surface of the filter when the flow rate of the sludge mixed liquor along the filter surface was 0.05 m/s or more. Even increased washing frequency had no effect on keeping the filtration flux, suggesting the high possibility that the pores of the filter might be blocked with the deposited sludge.

As shown in FIG. 6, the filtrate turbidity was as high as 10 degrees or more within 200 hours after starting the treatment, suggesting that a dynamic filter layer of sludge had not been formed well on the filter surface. The filtrate turbidity gradually decreased after 200 hours probably because the filtration flux decreased with blockage of the filter and the sludge entering into the filter also decreased.

EXAMPLE 2

Figure 7:
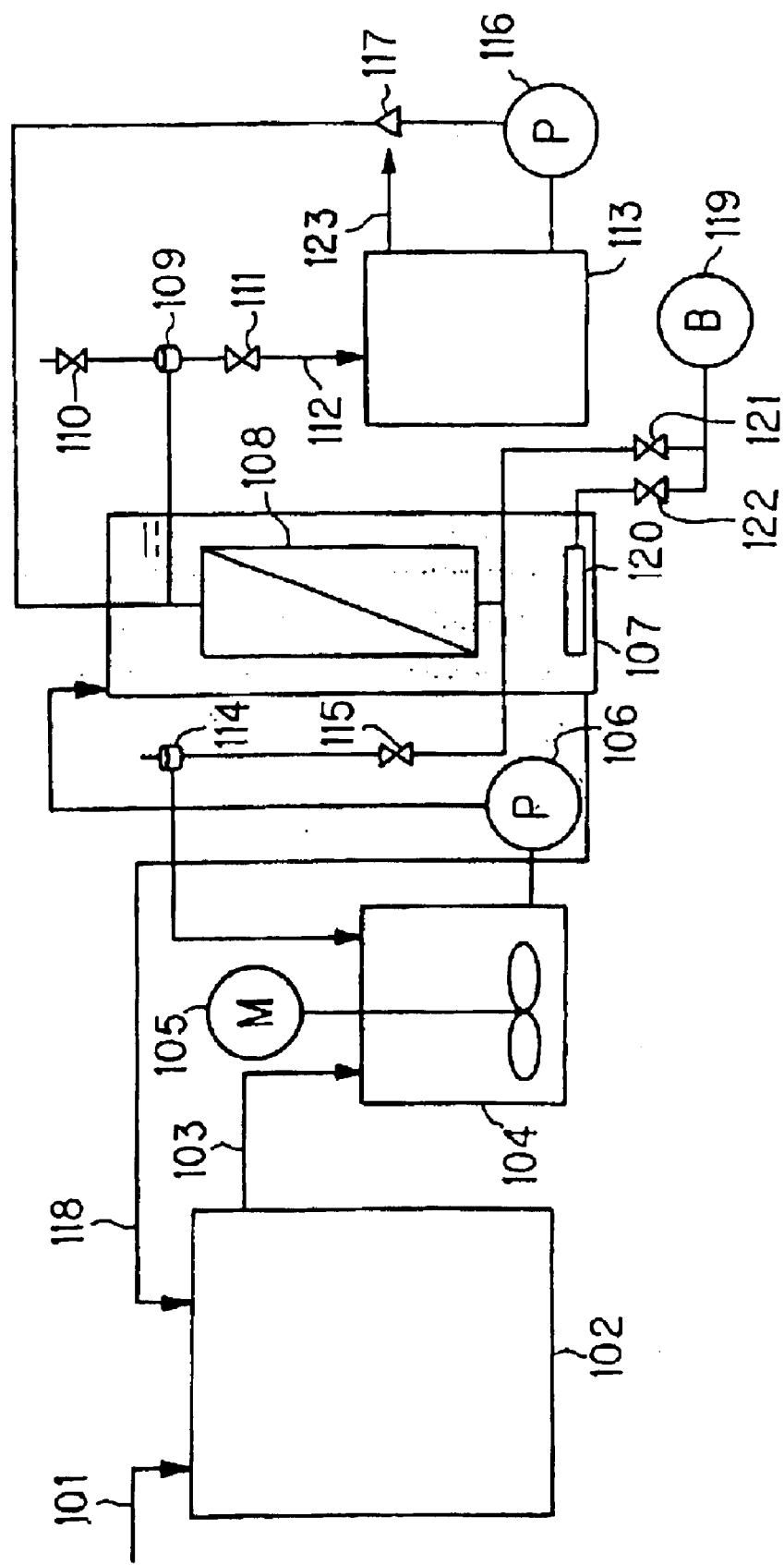
FIG. 7 is a flow sheet of another example of a wastewater treatment process according to the present invention.

FIG. 7 shows a flow sheet of another example of a wastewater treatment process for sewage from housing complexes according to the present invention. Influent raw water 101 is first introduced into biological reaction tank 102 where it is subjected to an aerobic treatment by the action of microorganisms in activated sludge contained in the tank. The effluent from biological reaction tank 102 flows down to sludge settling tank 104 via line 103. In sludge settling tank 104, sludge is flocculated and homogenized while it is mildly stirred with stirrer 105. The resulting sludge mixed liquor is supplied from sludge settling tank 104 to the top of solids-liquid separation tank 107 via sludge feed pump 106. The sludge mixed liquor is filtered by filter module 108 placed in solids-liquid separation tank 107 and filtrate 112 is collected by an intake pipe at the top of the filter module and enters into effluent tank 113 via solenoid valve 111. The effluent in effluent tank 113 is discharged at appropriate time outside the system via discharge pipe 123. The sludge having passed solids-liquid separation tank 107 is removed from the bottom of solids-liquid separation tank 107 as return sludge 118 and returned to biological reaction tank 102. The hydraulic head pressure on the filter module during filtration can be adjusted by switching filtrate level regulating valve 109 to open solenoid valve 110. Air-washing of the outside of the filter module is normally performed by closing solenoid valve 111 and activating air-washing blower 119 to supply air to diffuser tube 120 with solenoid valve 121 closed and solenoid valve 122 opened. Air-washing of the inside of the filter module is performed by supplying air from blower 119 with solenoid valve 122 closed and solenoid valve 121 opened. Water-backwashing of the inside of the filter module is carried out by activating water-backwashing pump 116 with solenoid valves 110 and 111 closed and solenoid valve 115 opened to introduce the filtrate in the effluent tank into the filter module from the top of the module. The backwashing water having passed the filter module is discharged from the discharge pipe at the bottom of the module into sludge settling tank 104 via solenoid valve 115. The water level of the discharged backwashing water is adjusted by controlling water level regulating valve 114 in such a manner that the hydraulic head pressure during backwashing equals to the hydraulic head pressure during filtration. Thus, the operation can be automated by switching solenoid valves in the following order: air-washing→water-backwashing→discharging backwashing water→filtration.

The system shown in FIG. 7 was used to perform a continuous wastewater treatment experiment. The treatment conditions in biological reaction tank 102 were the same as in Example 1. Table 4 below shows treatment conditions in solids-liquid separation tank 107.

TABLE 4

Treatment conditions
in the solids-liquid separation tank (Example 2)

| | |
|---|---|
| Effective area of the filter module (m$^2$) | 5 |
| Hydraulic head pressure during filtration (cm) | 10 |
| Average flow rate along the filter surface (m/s) | 0.01 |
| Hydraulic head pressure during discharging backwashing water (cm) | 10 |
| Air flow rate for air-washing the outside of the filter module (L/min) | 150 |
| Air flow rate for air-washing the inside of the filter module (L/min) | 30 |
| Backwashing water flow rate (L/min) | 140 |

In this example, the filter module consisted of a set of 5 sheets of a planar woven fabric filter having an effective area of 1 m$^2$ and placed in solids-liquid separation tank 117. The woven fabric used was a polyester material having a thickness of 0.1 mm, 200 meshes and a pore size of about 72 μm. The hydraulic head pressure during filtration and the hydraulic head pressure during discharging backwashing water were both 10 cm, and the average flow rate of the activated sludge mixed liquor along the surface of the filter module was 0.01 m/s. The air flow rate during air-washing of the outside of the filter module was 150 L/min, while the air flow rate during air-washing of the inside was 30 L/min. The water flow rate during water-backwashing was 140 L/min.

Table 5 below shows a time chart of the continuous operation. The filter module was washed by a continuous operation of a cycle of air-washing for 3 minutes, water-backwashing for 30 seconds and discharging the backwashing water for 2 minutes every 120 minutes of filtration. Air-washing normally involved aeration of the outside of the filter module, interspersed with air-washing of the inside of the filter module at a frequency of once in 50 cycles.

TABLE 5

Time chart of automated continuous operation (Example 2)

| | $T_0$ (wait) | $T_1$ (air-washing) | $T_2$ (water-backwashing) | $T_3$ (Discharge of backwashing water) | T4 (filtration) |
|---|---|---|---|---|---|
| Cycle period | 10 sec | 3 min | 30 sec | 3 min | 120 min |
| Air-washing blower | OFF | ON | OFF | OFF | OFF |
| Water-backwashing pump | OFF | OFF | ON | OFF | OFF |
| Solenoid valve 110 | open | open | close | open | open |
| Solenoid valve 111 | close | close | close | close | open |
| Solenoid valve 115 | close | close | open | open | close |
| During air-washing of the outside of the filter module | | | | | |
| Solenoid valve 121 | close | close | close | close | close |
| Solenoid valve 122 | close | open | close | close | close |
| During air-washing of the inside of the filter module (once in 50 cycles) | | | | | |
| Solenoid valve 121 | close | open | close | close | close |
| Solenoid valve 122 | close | open | close | close | close |

Figure 8:
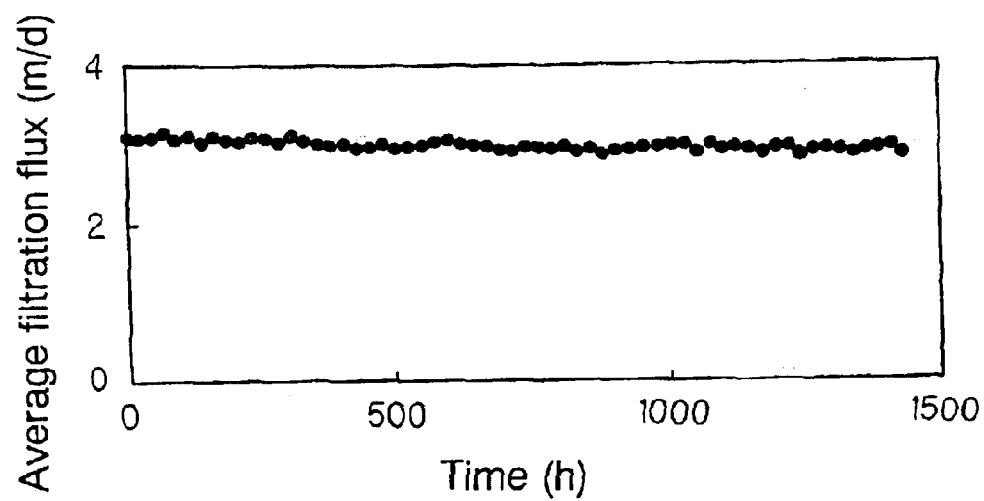
FIG. 8 is a graph showing plots of the average filtration flux versus time in Example 2.
Figure 9:
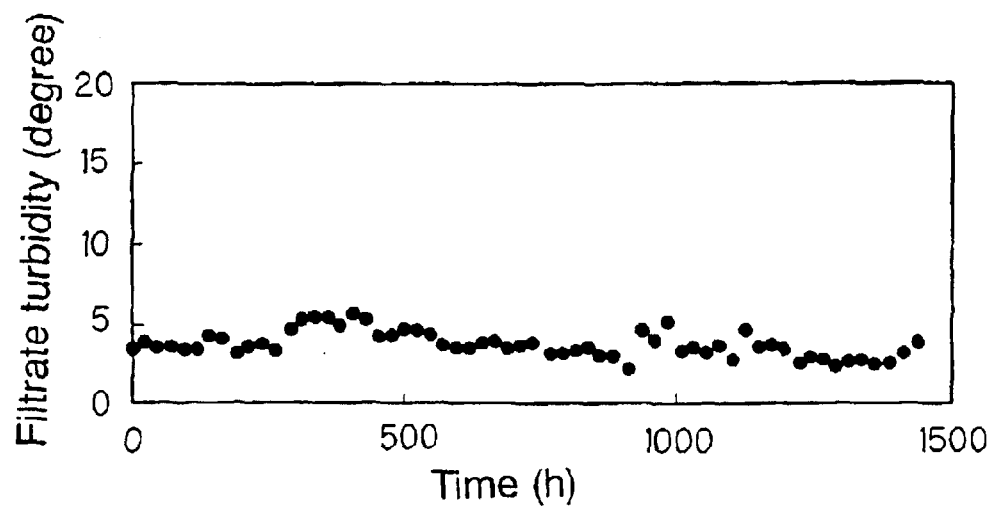
FIG. 9 is a graph showing plots of the filtrate turbidity versus time in Example 2.

FIG. 8 shows plots of the filtration flux of the filter module versus time in Example 2. As shown in FIG. 8, the average filtration flux was about 3 m/d during a continuous treatment for about 1500 hours, demonstrating that a stable treatment was obtained. FIG. 9 shows plots of the turbidity of the effluent. As shown in FIG. 9, the turbidity of the effluent was always around 5 degrees without significant variation during a continuous treatment for about 1500 hours, demonstrating that a dynamic filter layer of sludge was stably formed in the filter module and that a stable effluent water quality was obtained.

INDUSTRIAL APPLICABILITY

According to the present invention, a solids-liquid separation tank is provided at the subsequent stage to a biological reaction tank and a water-permeable filter is immersed in the solids-liquid separation tank, whereby a clear filtrate can be obtained with a reduced filtration pressure. In a preferred embodiment of the present invention, the activated sludge mixed liquor flows in a uniform direction at a flow rate of less than 0.05 m/s along the surface of the filter so that a good dynamic filter layer of sludge is readily formed and the filtration flux hardly decreases and a high flux is stably obtained, whereby the volume of the solids-liquid separation tank can be greatly reduced as compared with prior clarifies and therefore the treatment system can be more compact. In another preferred embodiment of the present invention, a flow rectifier is placed in the solids-liquid separation tank so that the activated sludge mixed liquor passes the filter after it passes the flow rectifier, whereby the activated sludge mixed liquor has a constant average velocity in the solids-liquid separation tank and a dynamic filter layer of sludge is evenly formed on the surface of the filter. In another preferred embodiment of the present invention, a washer is placed below the filter to regularly stop filtration and wash it, whereby the sludge layer formed on the surface of the filter can be easily separated. In another preferred embodiment of the present invention, concentrated sludge is returned to the biological reaction tank from the solids-liquid separation tank, whereby the BOD load in the biological reaction tank can be properly controlled to ensure a stable biological treatment.

What is claimed is:

1. A wastewater treatment process with biological treatment and solids-liquid separation, comprising:

introducing raw wastewater into a biological reaction tank containing activated sludge therein to biologically treat the raw wastewater, whereby a mixture of water and activated sludge is produced;

introducing the mixture of the activated sludge and the water into a solids-liquid separation tank containing a water-permeable filter therein;

forming a dynamic filter layer of sludge on a surface of the water-permeable filter, to filtrate a mixture of the activated sludge and water by solid-liquid separation; and producing a filtrate water through the layer of the activated sludge on the surface of the filter.

2. The process as defined in claim 1, wherein the solids-liquid separation is conducted by sucking an exit side of the water-permeable filter with a pump.

3. The process as defined in claim 1, wherein a moving velocity of the mixture along the surface of the water-permeable filter is less than 0.05 m/s in average.

4. The process as defined in claim 1, further comprising an equalizer provided in the solids-liquid separation tank.

5. The process as defined in claim 1, wherein solids-liquid separation is conducted by a hydraulic pressure of the mixture in the solids-liquid separation tank.

6. The process as defined in claim 1, wherein the water permeable filter has a pore size larger than particles of the activated sludge.

7. A wastewater treatment system with biological treatment and solids-liquid separation, comprising:
   a biological reaction tank for introducing raw wastewater to biologically treat the raw wastewater by the activated sludge therein to produce a mixture of the activated sludge and water; and
   a solids-liquid separation tank containing a water-permeable filter therein for introducing the mixture of the activated sludge and water, a dynamic filter layer of sludge being formed on a surface of the water-permeable filter to filtrate the mixture of activated sludge and water by solids-liquid separation.

8. The system as defined in claim 7, further comprising an equalizer provided in the solids-liquid separation tank.

9. The process as defined in claim 7, wherein the water permeable filter has a pore size larger than particles of the activated sludge.

10. The process as defined in claim 7, wherein solids-liquid separation is conducted by a hydraulic pressure of the mixture in the solids-liquid separation tank.

11. The process as defined in claim 7, further comprising a pump for sucking the exit side of the filter to conduct solids-liquid separation.

* * * * *